United States Patent
Azam et al.

(10) Patent No.: US 10,699,116 B2
(45) Date of Patent: Jun. 30, 2020

(54) EYE GAZE AUTHENTICATION

(71) Applicant: Hewlett-Packard Development Company, L.P., Houston, TX (US)

(72) Inventors: Syed S. Azam, Tomball, TX (US); James R. Waldron, Houston, TX (US); Kent E. Biggs, Tomball, TX (US); Richard E. Hodges, Magnolia, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 131 days.

(21) Appl. No.: 15/544,702

(22) PCT Filed: Feb. 20, 2015

(86) PCT No.: PCT/US2015/016847
§ 371 (c)(1),
(2) Date: Jul. 19, 2017

(87) PCT Pub. No.: WO2016/133540
PCT Pub. Date: Aug. 25, 2016

(65) Prior Publication Data
US 2018/0018514 A1    Jan. 18, 2018

(51) Int. Cl.
*G06F 21/00* (2013.01)
*G06K 9/00* (2006.01)
(Continued)

(52) U.S. Cl.
CPC ........ *G06K 9/00577* (2013.01); *G06F 3/013* (2013.01); *G06F 3/017* (2013.01);
(Continued)

(58) Field of Classification Search
CPC ..................................................... G06F 3/013
See application file for complete search history.

(56) References Cited

U.S. PATENT DOCUMENTS 7,986,816 B1    7/2011  Hoanca et al.
8,856,541 B1   10/2014  Chaudhury et al.
(Continued)

FOREIGN PATENT DOCUMENTS

| JP | 2005149326 | 6/2005 |
| TW | 201403511 A | 1/2014 |
| WO | WO-2013081673 A1 | 6/2013 |

OTHER PUBLICATIONS

Anthony J. M. et al.; "Gaze Based User Authentication for Personal Computer Applications"; 5 pages, Jun. 5, 2019.
(Continued)

*Primary Examiner* — Josnel Jeudy
(74) *Attorney, Agent, or Firm* — Michael A. Dryja (57) ABSTRACT

According to an example of the present disclosure, an image collection is loaded. At least one image property of the image collection is randomized, and the image collection is displayed. A registered sequence of images is accessed. At least one eye gaze and at least one eye gaze time interval are captured. A selection sequence of images in the randomized image collection is determined based on the at least one eye gaze and the at least one eye gaze time interval, and a further determination is made as to whether the selection sequence of the images in the randomized image collection matches the registered sequence of images.

18 Claims, 10 Drawing Sheets

(51) Int. Cl.
    *G06F 21/32*     (2013.01)
    *G06F 21/36*     (2013.01)
    *G06F 3/01*     (2006.01)

(52) U.S. Cl.
    CPC .............. *G06F 21/32* (2013.01); *G06F 21/36* (2013.01); *G06K 9/00335* (2013.01); *G06K 9/00604* (2013.01); *G06K 9/00617* (2013.01)

(56) References Cited

U.S. PATENT DOCUMENTS

| | | |
|---|---|---|
| 2010/0039617 A1 | 2/2010 | Martinez-Conde et al. |
| 2013/0044055 A1 | 2/2013 | Karmarkar et al. |
| 2014/0020091 A1 | 1/2014 | Pasquero |
| 2014/0213930 A1* | 7/2014 | Mori ........................ A61B 5/16 600/558 |
| 2014/0289834 A1 | 9/2014 | Lindemann et al. |

OTHER PUBLICATIONS

Carleton University; "Input Precision for Gaze-based Graphical Passwords"; Apr. 10-15, 2010; 6 pages.

Fookes, C.; "Eigengaze—Covert Behavioral Biometric Exploiting Visual Attention Characteristics"; 4 pages, Jun. 5, 2019.

Kumar M. et al.; "Reducing Shoulder-surfing by Using Gaze-based Password Entry"; 7 pages, Jun. 5, 2019.

Sharma N. et al.; "An Approach to Enhance the Usability, Security and Compatibility of a Web Browser"; Mar.-Apr. 2013; 5 pages.

Weaver J. et al.; "Gaze-based Password Authentication Through Automatic Clustering of Gaze Points"; 2011; 6 pages.

\* cited by examiner

EYE GAZE AUTHENTICATION

BACKGROUND

Data stored on electronic devices in the consumer, commercial, and industrial sectors often includes information that is associated with varying levels of confidentiality and sensitivity. A user trying to gate access to a device, such as a desktop computer, laptop computer, or mobile device, or to a system or service, such as an application, portal, or website, may be asked to login or authenticate prior to receiving or being granted access to the device or system.

DETAILED DESCRIPTION

Various examples described herein provide for authenticating a user based on the user's eye gaze toward, for example, a display, to some examples, the user may register a combination and/or sequence of images during a registration process on a system or a device. When the user seeks to authenticate to the system or device, the images may be displayed in dynamic or random locations and/or sixes as part of an image collection or collage, and the user's eye gaze toward those images may be tracked and/or captured by a sensor such that a user may select images by way of their eye gaze and/or eye movement. In some examples, when the user's eye gaze is determined to select images that match the combination and/or sequence of registered images, the user may be granted access to the device or system.

Generally, a user of an electronic device such as a desktop computer, laptop computer, tablet, mobile device, retail point of sale device, or other device (hereinafter "device") or a system such as an application, portal, or website, (hereafter "system") may need to protect or restrict access to the device or system with, for example, a password or other form of authentication.

Passwords may offer a weak form of authentication, either from the inherent weakness of passwords, or due to the ability to compromise a password through malicious activities such as password cracking applications, key-logging applications, spoofed e-mails, social engineering or manipulation, "shoulder surfing" techniques, video recording, and other techniques. Weak passwords may be especially problematic in devices and/or systems requiring higher levels of security. Moreover, passwords may be difficult to remember, leading to user frustration, an inability to access devices or systems, and/or the need for administrator intervention and overhead.

In contrast to the challenges of passwords, the human brain includes the fusiform gyrus, an area of the brain that among other things, provides for face and body recognition. The human brain may be able to recognize, for example, a face among other faces in a collection or collage of images, even when the size and the location of the face changes within the collage each time the collage is viewed by the human brain.

According to an example of the present disclosure, an image collection is loaded. At least one image property of the image collection is randomized, and the image collection is displayed. A registered sequence of images is accessed. At least one eye gaze and at least one eye gaze time interval are captured. A selection sequence of images in the randomized image collection is determined based on the at least one eye gaze and the at least one eye gaze time interval, and a further determination is made as to whether the selection sequence of the images in the randomized image collection matches the registered sequence of images.

FIGS. 1A-D Illustrate a device for user authentication based on user eye gaze corresponding to an image collection, according to an example of the present disclosure.

Figure 1A:
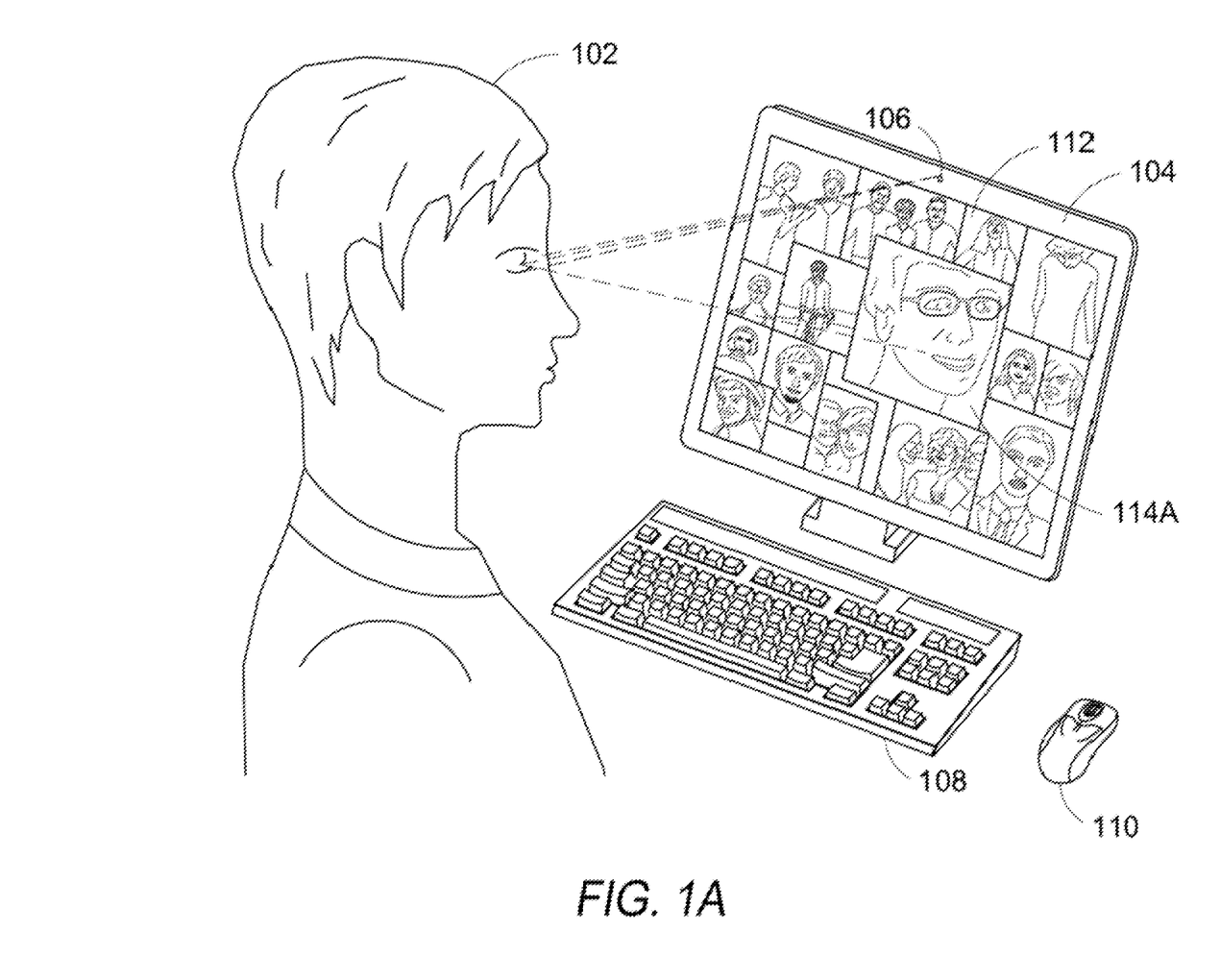
FIGS. 1A-1D illustrate a device for user authentication based on user eye gaze corresponding to images in an image collection, according to an example of the present disclosure.

In the example of FIG. 1A, a user 102 may be positioned in front of a device 104. Device 104 may display an operating system desktop, authentication screens, applications, portals, websites, or other content. The display may also be coupled to a keyboard 108 and mouse 110, or other devices or peripherals. Device 104 may also comprise a camera, light-emitting diode ("LED"), or other sensor 106 for detecting a user 102, a distance or angle between user 102 and device 104, and eye gazes or eye movements of user 102.

More specifically, in the example of FIG. 1A, user 102 may be detected by sensor 106. Sensor 106 may be, as examples, a high definition red green blue infrared ("HD RGB-IR") sensor, an HD RGB (or black and white) complementary metal-oxide semiconductor ("CMOS") sensor and lens, an IR LED, a non-collimated light source, or any combination of sensors or illumination sources to detect eye gaze. In one example, the vector between a pupil of user 102 and the corneal reflections may be used to compote the point on device 104 where a user is looking. It will be appreciated that other techniques may be employed to determine the point or points on device 104 where a user is looking at any given time.

In the example of FIG. 1A, device 104 may display a collection group, combination, or collage 112 (hereinafter "collage") of images on the device and/or electronic display coupled to the device. In various examples, the collage comprises images from a photo collection of user 102 or another user, e.g., a user library; images from another source such as the internet or stock, photography; or a combination of the two. In an example, the collage 112 may be displayed when a device or system is in a locked or secured state, i.e., when the device or system, is awaiting user authentication to permit access to the device or system. For example, collage 112 may be displayed as a login screen for an operating system on a local computer, or a login screen for a website from a remote server.

In some examples, the images that are displayed as part of collage 112 are selected by user 102 during a user registration, e.g., when a user selects or configures the authentication settings of a device or system. In some examples, user 102 may select a series of images that will be part of the collage 112, which may include images that are to later be selected to authenticate, as well as other "filler" images that will not be used to authenticate but will 111 the screen around the images that were registered by user 102. Filler images may also be randomly selected from a photo library or other source, such as the internet or stock photography.

In some examples, user 102 may also select the order or sequence in which the images are to later be selected in order to authenticate. According to other examples, the image used to authenticate may fee randomly selected by a device or system, with the user registering only the order in which the images are to be later selected in order to authenticate.

In some examples, the registration may utilize the eye gaze tracking techniques described herein, while in other examples, a mouse, touch input, or other input device may be used to register or configure the device or system authentication. The user registration may include a training component to teach user 102 how to register and later authenticate.

The collage 112 displayed on device 104 may display images based on the registration of user 102, described above, with an image property or properties of at least one image in the collage set dynamically or randomly each time the collage is displayed, e.g., at each user login or authentication. For example, the location of images within the collage and/or the size of each image may be set to load randomly each time the collage is loaded, i.e., each time a user is to authenticate. The randomization or change in the collage may prevent another user from attempting to record the head or eye movement of user 102 to later replicate that pattern or sequence, since the changes in the collage 112 at each authentication will instead rely on the ability of user 102 to recognize images in the collage regardless of their location, placement, size, or other properly changes.

As discussed below in more detail, sensor 106 may detect where a user is looking at any given time based on, for example, the vector between a pupil of user 102 and the corneal reflections. In the example of FIG. 1A, sensor 106 may detect that user 102 is looking at the image labeled 114A, i.e., the large image toward the center of device 104. Image 114A may be the first in a series of images that user 102 has registered to be part of an authentication process or flow to unlock access to device 104 and/or another device coupled to device 104, such as a computer or a server hosting a website.

In some examples, a time interval relating to how long a user has looked at a given image or point on a display, at image 114A, may be captured, or recorded to determine when an image is being selected, or simply viewed as a user's eye passes the image while scanning the display. For example, a user may direct his or her gaze toward image 114A while scanning device 104 for an image, but not intend to select image 114. A as part of the authentication to the device. Sensor 106 may record, in an example, the gaze toward image 114A when user 102 maintains or locks the gaze onto an image, e.g., image 114A, for a minimum period of time, such as two seconds. In some examples, sensor 106 may also record the number of images looked at during an authentication and stop the authentication when an eye gaze count, i.e., a number of tries, is exceeded.

In some examples, visual, audio, haptic, or other feedback may be provided to user 102 upon a gaze satisfying the minimum time interval to select an image that the user intends to be past of the authentication sequence. For example, the selected image may be altered by a glow, a border change, or a brightness change to illustrate selection of the image, or an indicator may appear in a position away from the selected image to minimize the ability of unauthorized users in the vicinity of device 104 to see the image that has been selected. In other examples, the positioning and/or size of the images in the collage 112 may cycle alter each selection of an image as feedback that an image has been successfully selected.

Figure 1B:
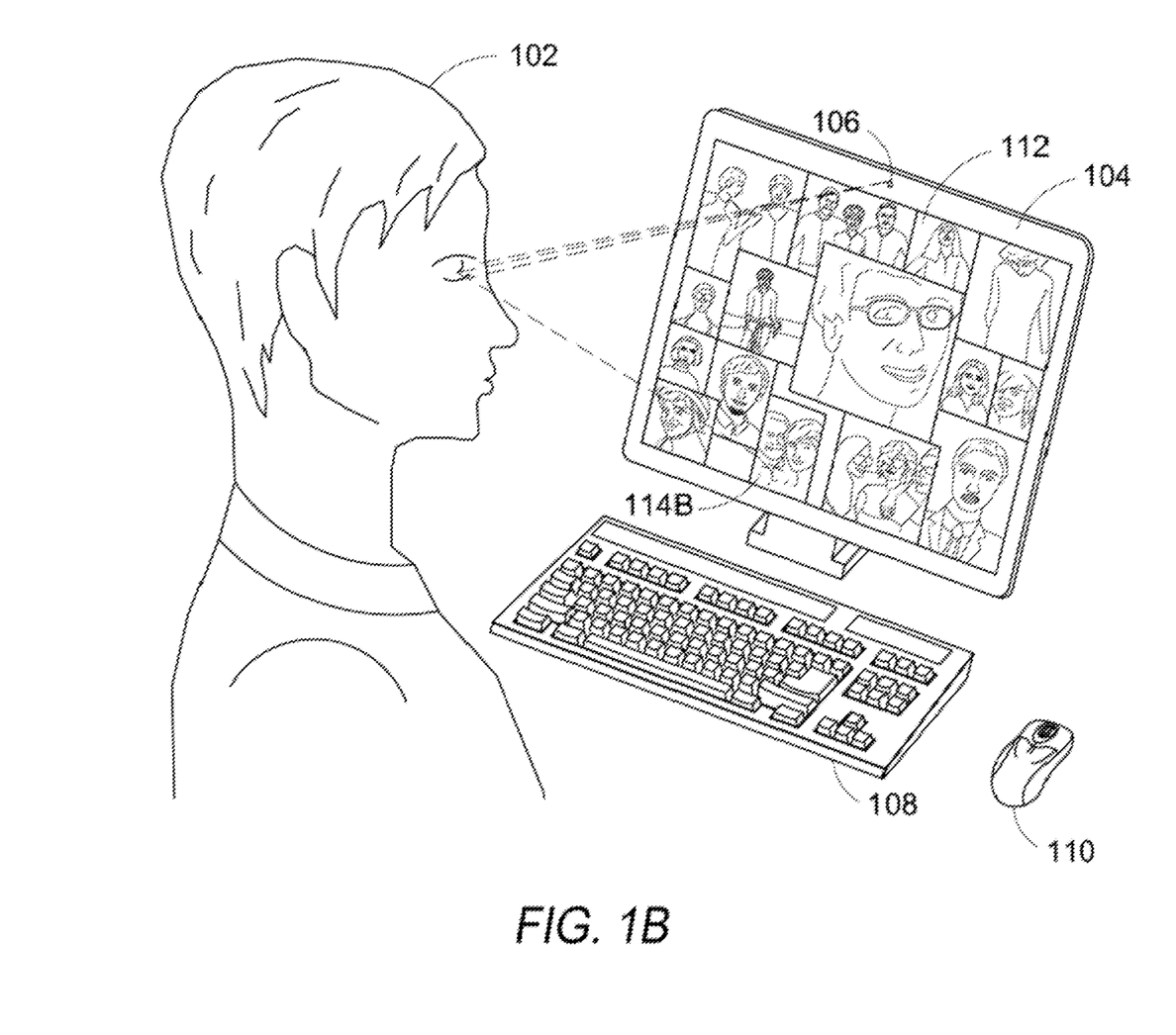

In the example of FIG. 1B, the eye gaze of user 102 has moved from image 114A that is selected in FIG. 1A to image 114B. As above, in various examples, image 114B may be selected as part of the authentication process, or selected after a minimum time interval of the user's gaze is satisfied.

In the example of FIG. 1, the eye gaze of user 102 has moved from image 114B that was selected in FIG. 1B to image 114C. In the example of FIGS. 1A-C user 102 may have registered images 114A, 114B, and 114C during a user registration, and then authenticated to device 104 by selecting images 114A-C as shown in FIGS. 1A-C. Accordingly, user 102 may gain access to a device or system, e.g., device 104. In some examples, as shown in FIG. 10, a message or prompt 116 may display to indicate that the user has been authenticated. In other examples, the user may gain access directly to a device or system, such as directly to an operating system or a website, without prompt 116 first displaying.

Figure 2A:
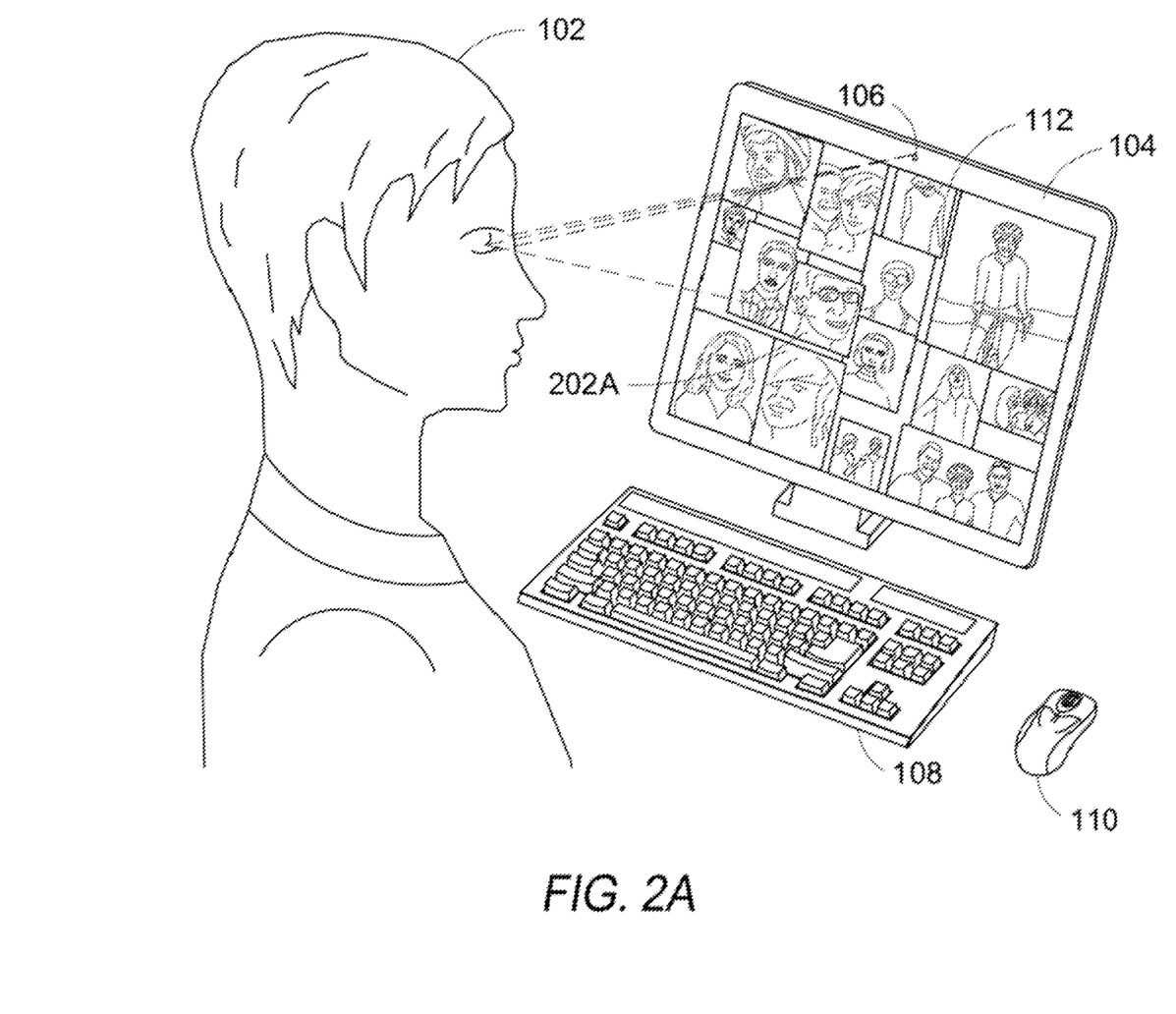
FIGS. 2A-2D illustrate a device for user authentication based on user eye gaze corresponding to images in an image collection, according to an example of the present disclosure.
Figure 2B:
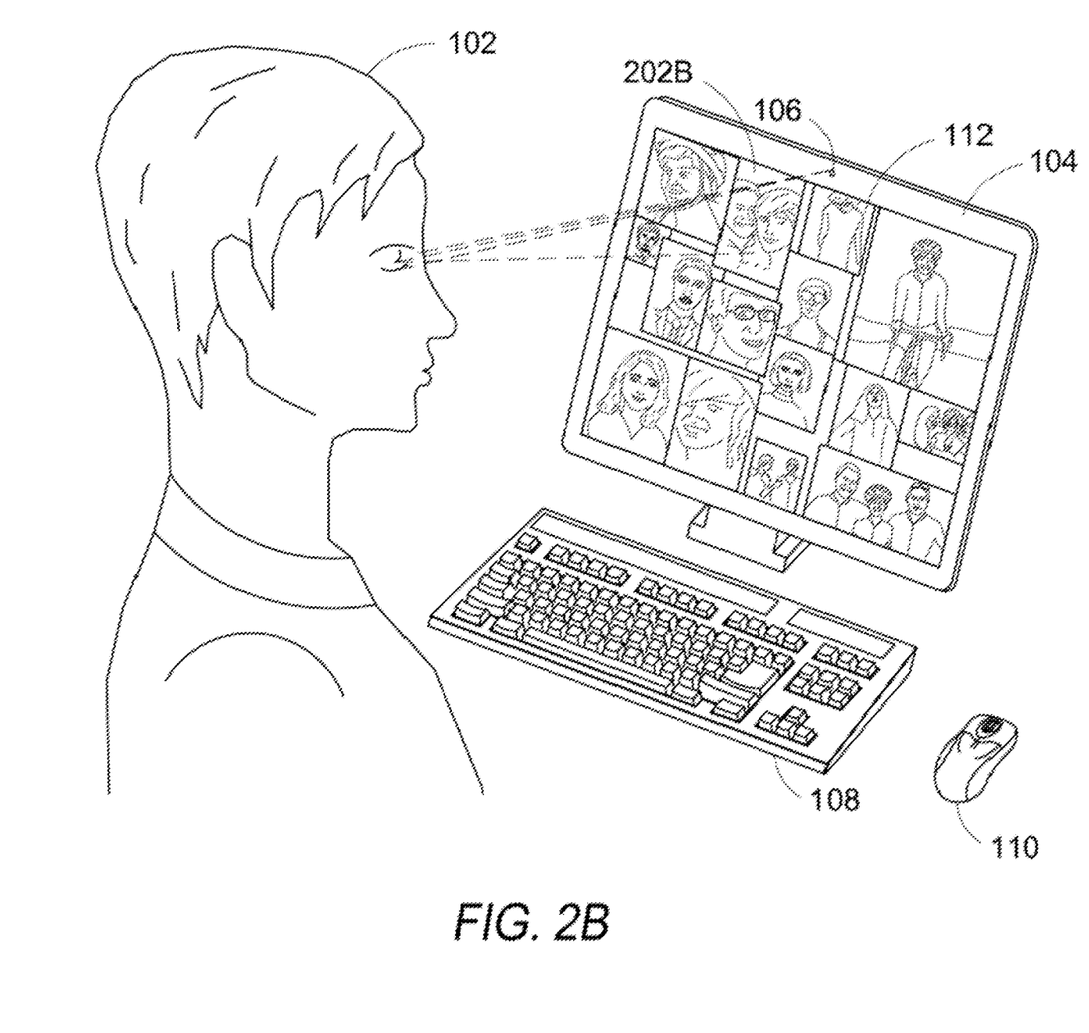

FIGS. 2A-2B illustrate a device for user authentication based on user eye gaze corresponding to an image collection, according to an example of the present disclosure. In some examples, FIGS. 2A-D illustrate a subsequent authentication to device 104 by user 102.

In FIG. 2A, device 104 has displayed the same images in collage 112 as in FIGS. 1A-1D, with the figures in different relative locations and in different sizes. As discussed above, the image properties such as location, size, orientation, or other features may be dynamically or randomly set on device 104 with each authentication.

Figure 1C:
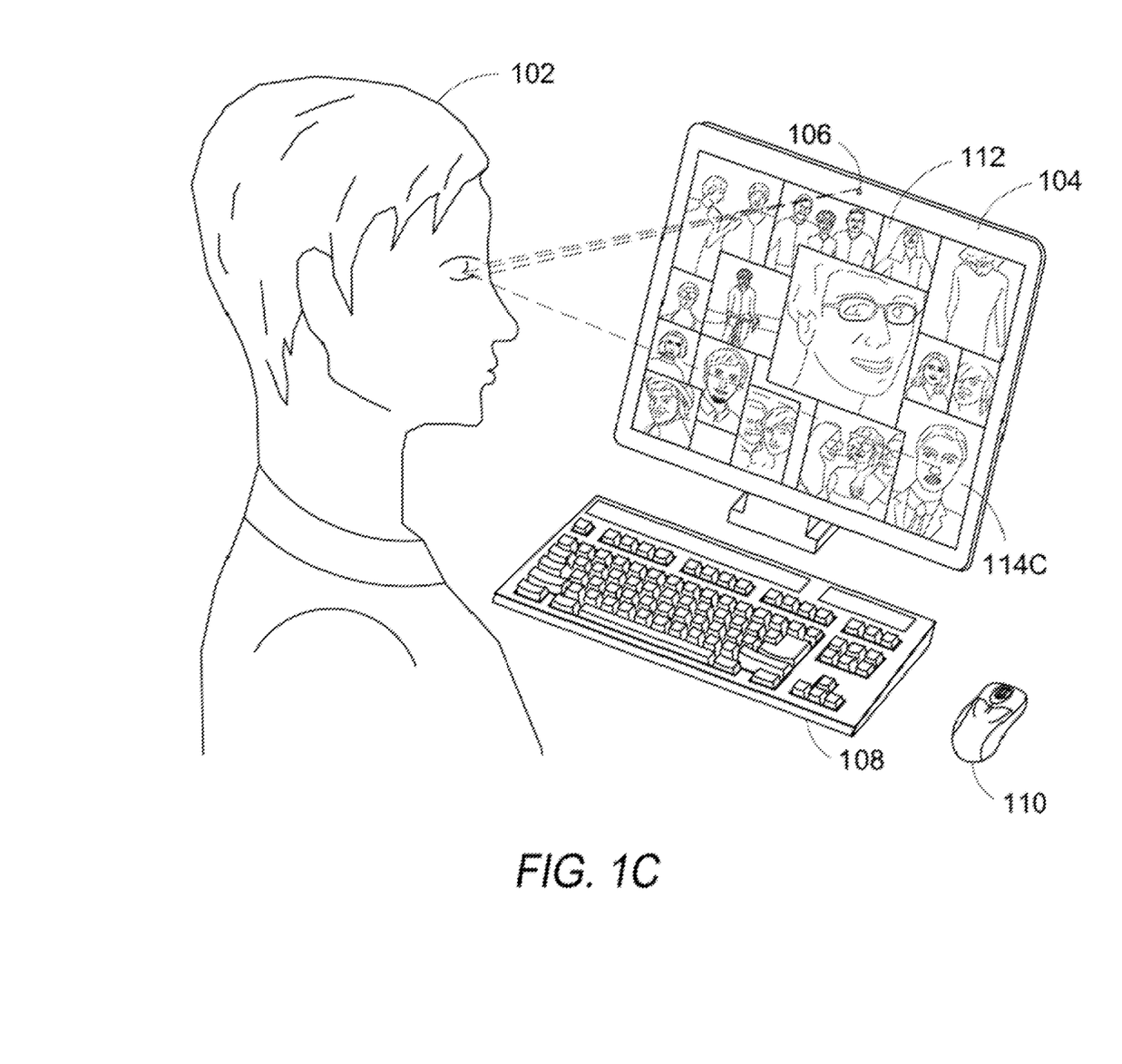
Figure 1D:
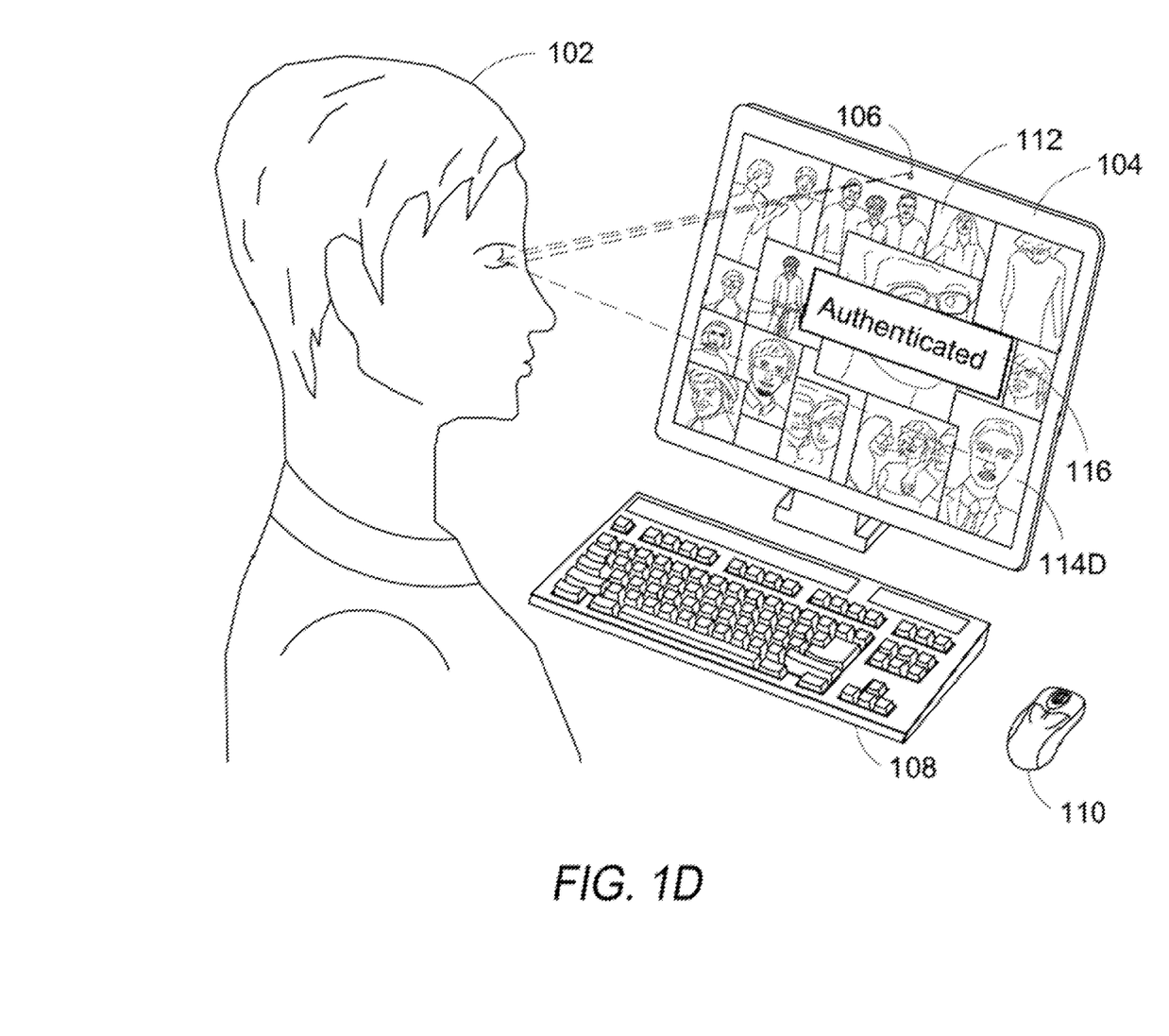
Figure 2C:
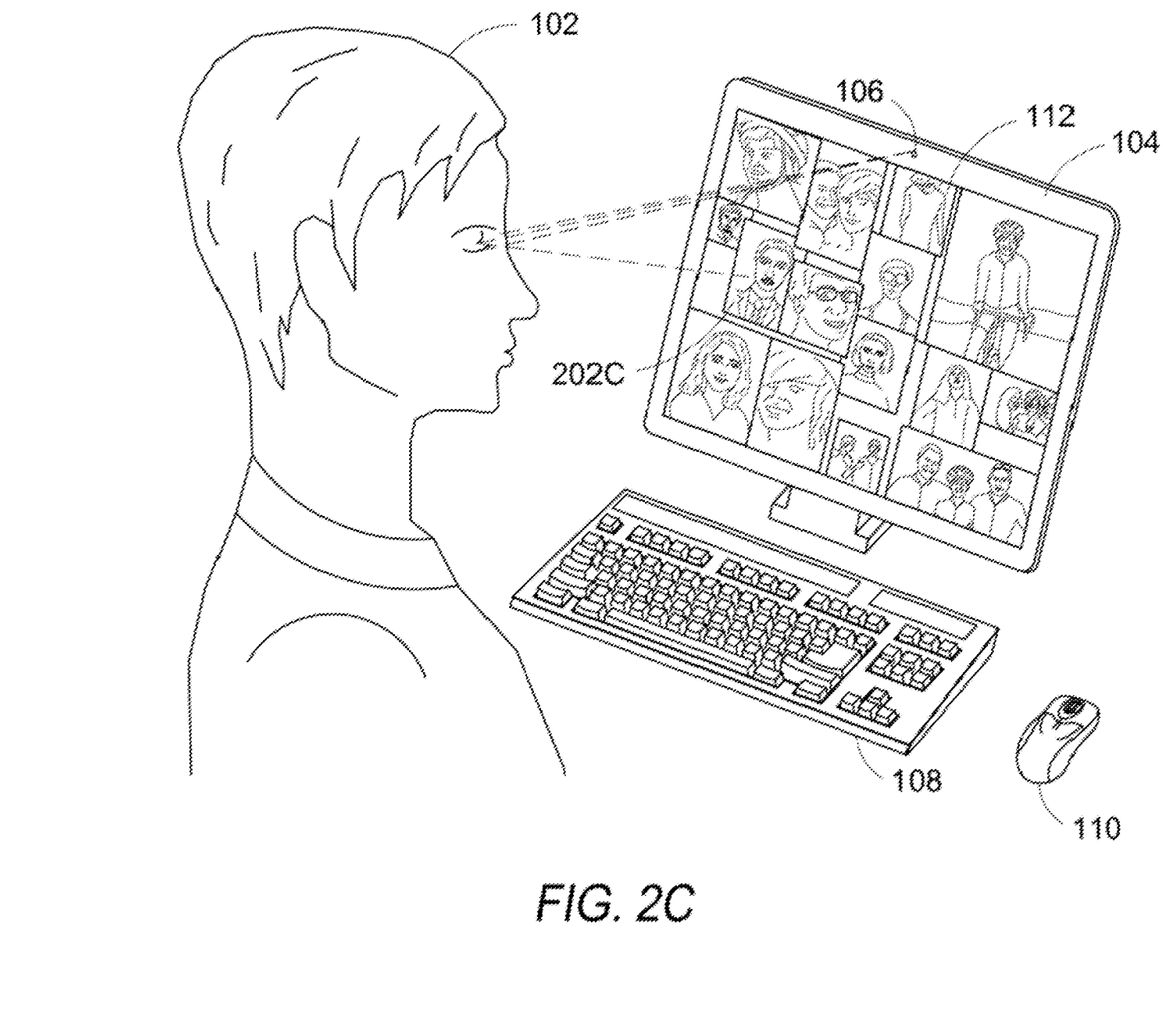
Figure 2D:
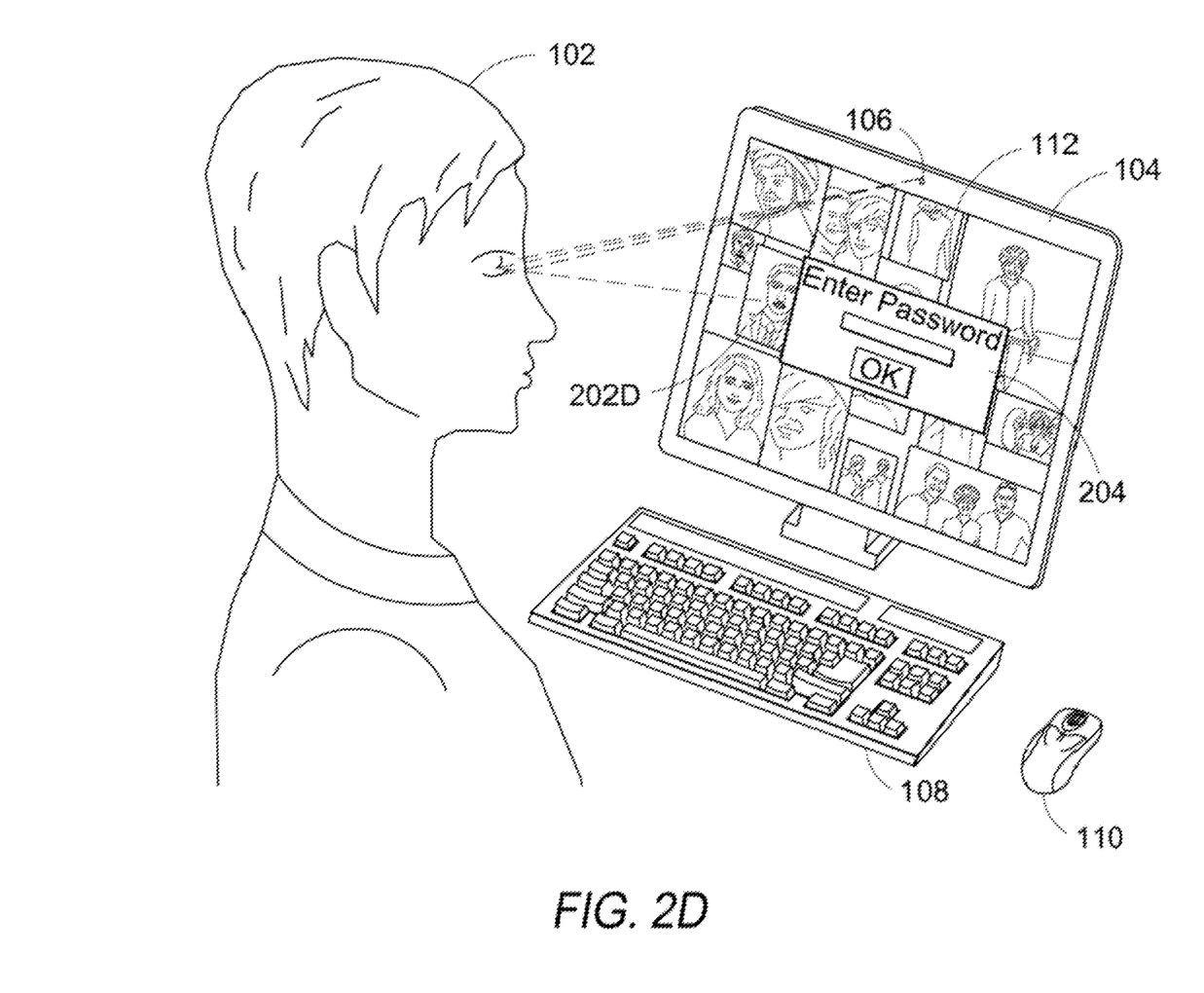

In FIGS. 2A-2C, the eye gaze of user 102 has moved from image 202A to 202B to 202C, with the user following the same combination of images and sequence of FIGS. 1A-1C, irrespective of the change in position and size of the images in collage 112. In FIG. 2D, once a user has authenticated by way of the image collage, a second form of authentication may be utilized to increase the security level. For example, a password prompt may be displayed, such as prompt 204, or another form of authentication may be used such as facial recognition, voice recognition, fingerprint recognition, or other biometric, and/or a personal identification number ("PIN"), a PIN via short message service or voice call, or other secondary form of authentication. When the secondary form of authentication is validated, user 102 may be granted access to the device or system, e.g., device 104.

Figure 3:
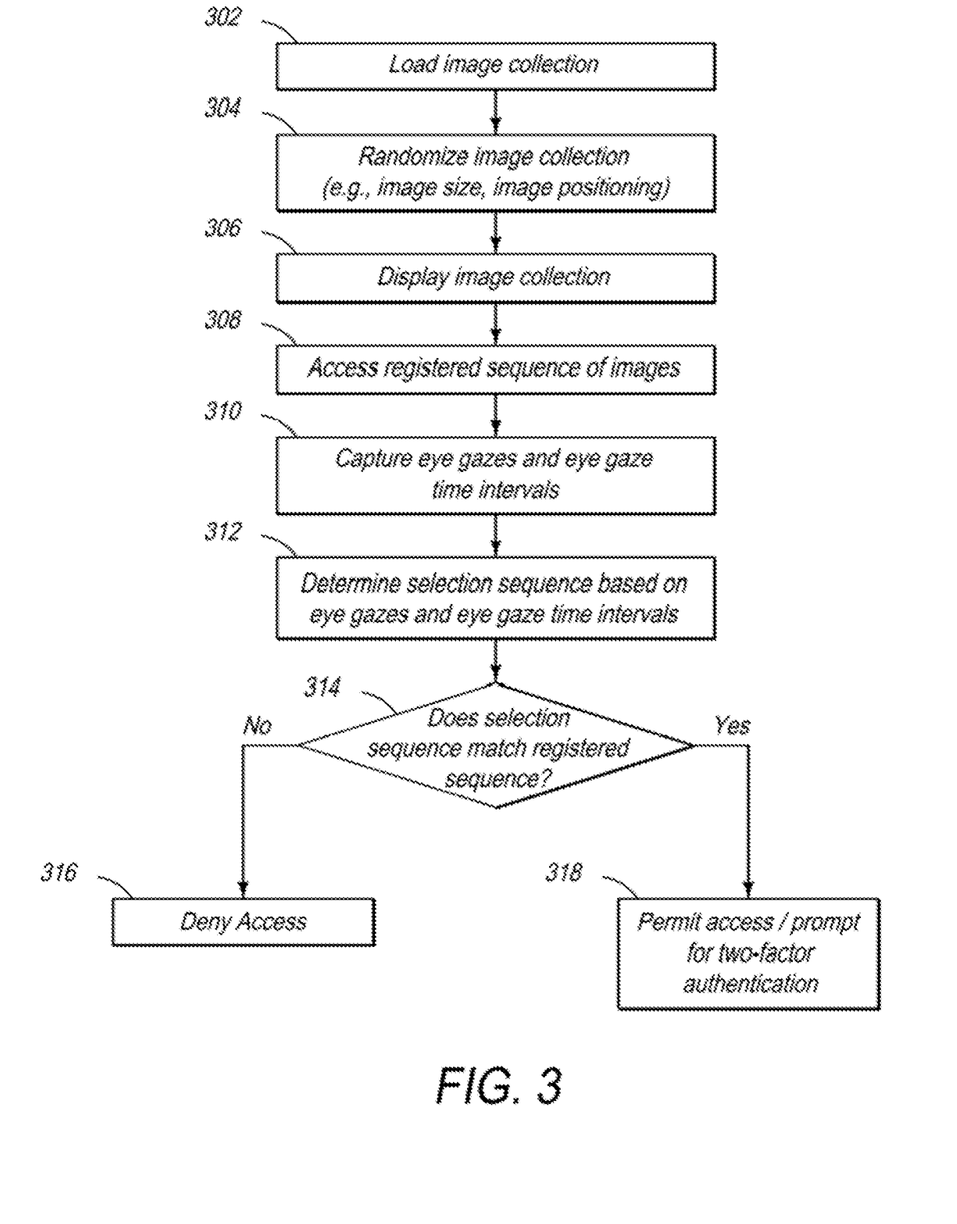
FIG. 3 is a flowchart showing a method of authenticating a user based on eye gaze corresponding to Images in an image collection, according to an example of die present disclosure.

FIG. 3 is a flowchart showing a method of authenticating a user based on eye gaze corresponding to an image collection, according to an example of the present disclosure.

In block 302, an image collection or collage may be loaded by, e.g., a processor on a device, which may be device used directly by a user, or a device such as a website or application server capable of transmitting data and/or images to a user. As discussed above, the image collection may be sourced from a photo collection of user 102 or another user; images from another source such as the internet or stock photography; or a combination of the two.

In block 304, the image collection may be randomized or dynamically displayed and/or updated. For example, as discussed above, the location of images within the collage and/or the size of each image may be set to load randomly each time the collage is loaded. In block 306, the image collection, which may be randomized or dynamically updated, is displayed, e.g., on device 104 or other device.

In block 308, a registered set of images and/or sequence of images may be accessed. As discussed above, a user may have selected a set of images and/or an order of images during a registration process, with those images and/or sequence of images used in a subsequent authentication to unlock a device of system. The set of images and/or sequence of images may be accessed in block 308 from, e.g., a memory.

In block 310, sensor 106, in an example, may be used to capture eye gazes, movements, and/or paths of a user, and time intervals of each gaze, movement, and/or path. For example, as shown in FIGS. 1A-C, sensor 106 may capture user 102's eye gaze from image 114A to 114B to 114C, with sensor 106 indicating to device 104 when an eye gaze has satisfied a minimum time interval for a gaze on a particular image sufficient to select that image as past of the authentication process. The gazes, movements, and/or paths, along with time intervals, may be stored in a memory, and may be referred to as a selection sequence or combination.

In block 314, a determination may be made as to whether the selection sequence or combination of images selected by the user during authentication matches the registered sequence or combination entered by the user during registration. When the sequences or combinations match, flow may proceed to block 318 where access to device 104 is granted, or when the sequences or combinations do not match, flow may proceed to block 316 where access to device 104 may be denied. In some examples where access is granted, a second form of authentication may be requested prior to permitting access, while in other examples, the flow of FIG. 3 may itself be a second form of authentication after another form, e.g., a password or biometric, is successfully entered.

Figure 4:
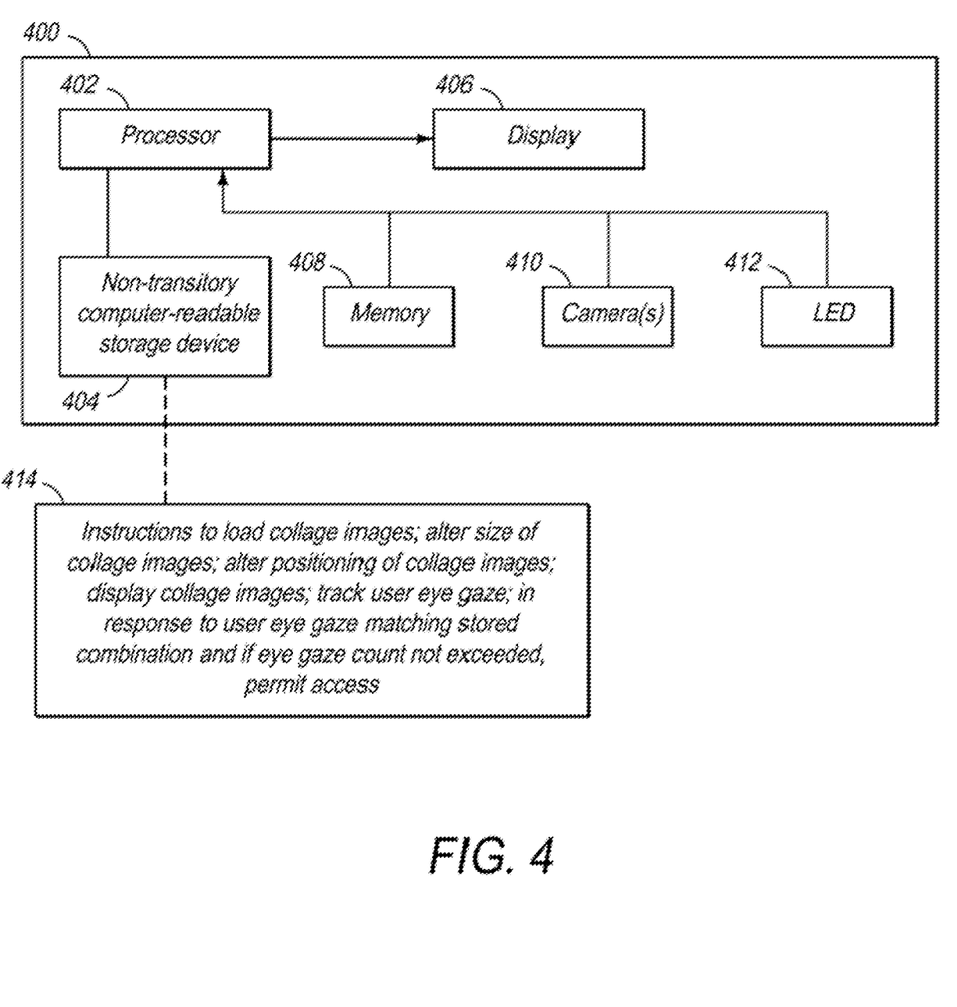
FIG. 4 illustrates a schematic representation of a computing device that may be used as a platform for authenticating a user based on eye gaze corresponding to images in an image collection, according to an example of the present disclosure.

FIG. 4 illustrates a schematic representation of a computing device that may be used as a platform for authenticating a user based on eye gaze corresponding to images in an image collection.

In an example, device 400 comprises a processing resource such as processor or CPU 402; a non-transitory computer-readable storage medium 404, a display 406, a memory 408 such as a RAM, a ROM, or a Flash memory, a sensor 410, and an LED, combination of LEDs, or other illumination source 412. In some examples, device 400 may also comprise a disk drive such as a hard disk drive or a solid state disk drive; an operating system; and a network interface such as a Local Area Network LAN card, a wireless 802.11x LAN card, a 3G or 4G mobile WAN, or a WiMax WAN card, Each of these components may be operatively coupled to a bus.

Some or all of the operations set forth in the figures may be contained as a utility, program, or subprogram in any desired computer readable storage medium, or embedded on hardware. The computer readable medium may be any suitable medium that participates in providing instructions to the processing resource 402 for execution. For example, the computer readable medium may be non-volatile media, such as an optical or a magnetic disk, or volatile media, such as memory. The computer readable medium may also store other machine-readable instructions, including instructions downloaded from a network or the internet.

In addition, the operations may be embodied by machine-readable instructions. For example, they may exist as machine-readable instructions in source code, object code, executable code, or other formats.

Device 400 may comprise, for example, a non-transitory computer readable medium that may comprise instructions 414, when executed by a machine (e.g., a computer), to load an image collage; alter a size of at least one image in the image collage; alter a position of at least one image in the image collage; and display the image collection. Instructions 414 may also cause a machine to track, with a sensor, an eye gaze of a user toward at least two images in the image collage, and permit access to a computer program in response to a determination that the tracked eye gaze of the user toward the image collage matches a stored combination of images and an eye gaze count is not exceeded.

The computer-readable medium may also store an operating system such as Microsoft Windows, Mac OS, Unix, or Linux; network applications such as network interfaces and/or cloud interfaces; and an eye tracking module, for example. The operating system may be multi-user, multi-processing, multitasking, and/or multithreading. The operating system may also perform basic tasks such as recognizing input from input devices, such as a keyboard or a keypad; sending output to a display; keeping track of files and directories on a medium; controlling peripheral devices, such as drives, printers, or image capture devices; and/or managing traffic on a bus. The network applications may include various components for establishing and maintaining network connections, such as machine readable instructions for implementing communication protocols including, but not limited to, TCP/IP, HTTP, Ethernet, USB, and FireWire.

In certain examples, some or all of the processes performed herein may be integrated into the operating system. In certain examples, the processes may be at least partially implemented in digital electronic circuitry, in computer hardware, in machine readable instructions (such, as firmware and/or software), or in any combination thereof.

The above discussion is meant to be illustrative of the principles and various examples of the present disclosure. Numerous variations and modifications will become apparent to those skilled in the art once the above disclosure is fully appreciated, it is intended that the following claims be interpreted to embrace all such variations and modifications.

What is claimed is:

1. A method of user authentication based on eye gaze, comprising:

loading, using a processor, an image collection from a memory;

randomizing, using the processor, a property of the image collection;

displaying, using a display, the randomized image collection;

accessing, using the processor, a registered sequence of images;

capturing, using a camera coupled to the display, a sequence of consecutive eye gazes by adding an eye gaze to the sequence each time a new eye gaze greater than an eye gaze time interval in length is detected; and determining, using the processor, a selection sequence of images in the randomized image collection corresponding to the sequence of consecutive eye gazes, and further determining when the selection sequence of the images matches the registered sequence of images.

2. The method of claim 1 wherein, in response to the selection sequence of the images in the randomized image collection matching the registered sequence of images, the method further comprises authenticating the user.

3. The method of claim 1 wherein, in response to the selection sequence of the images in the randomized image collection matching the registered sequence of images, the method further comprises prompting for a second form of authentication.

4. The method of claim 1, wherein the image property is comprises a property selected from a property group comprising an image size and an image orientation.

5. The method of claim 1, wherein the image property comprises a set of image coordinates within an image collage.

6. The method of claim 1, wherein the image collection comprises images from a user library.

7. A system for user authentication, comprising:
a display;
a sensor to detect a user eye gaze; and
a processing resource communicatively coupled to the sensor;
wherein the display is to display a combination of images in an image collage,
wherein the sensor is to capture a sequence of consecutive eye gazes by adding an eye gaze to the sequence each time a new eye gaze greater than a threshold eye gaze time interval in length is detected, and
wherein the processing resource is to randomize a size and a location of the combination of images in the image collage, load a registered combination of images, determine a selection sequence of images in the randomized combination images, compare the registered combination of images to the selection sequence of images, and prompt the user for a second form of authentication.

8. The system of claim 7, wherein the display is to provide visual feedback to the user as the consecutive eye gazes that are each greater than the threshold eye gaze time interval in length are captured.

9. The system of claim 7, wherein the sensor is a complementary metal-oxide-semiconductor camera.

10. The system of claim 7, wherein the sensor is coupled to a non-collimated light source.

11. The system of claim 7, wherein the second form of authentication is at least one of a password or biometric authentication.

12. A non-transitory computer readable storage medium on which is stored a
computer program for user authentication, said computer program comprising a set of instructions that, when executed, cause the computer to:
load an image collage;
alter a property of a subset of the image collage;
display the altered subset of the image collage;
track, with a sensor, a selection sequence of images in the subset as consecutive eye gazes on the images greater than a threshold eye gaze time interval in length are detected; and
compare the selection sequence to a stored combination of images and determine when the selection sequence matches the stored combination.

13. The computer readable storage medium of claim 12, wherein the property comprises a property selected from a group comprising an image size, an image orientation, and an image position.

14. The computer readable storage medium of claim 12, wherein the stored combination of images is selected by a detecting a registration sequence of consecutive eye gazes that are each greater than the threshold eye gaze time interval in length.

15. The computer readable storage medium of claim 12, wherein the stored combination of images includes a sequence indicator.

16. The method of claim 1, further comprising:
providing visual feedback to the user as the consecutive eye gazes that are each greater than the threshold eye gaze time interval in length are captured.

17. The computer readable storage medium of claim 12, wherein the computer program is further to cause the computer to permit access to a computer system when the selection sequence matches the stored combination.

18. The computer readable storage medium of claim 12, wherein the computer program is further to cause the computer to provide visual feedback to the user as the consecutive eye gazes that are each greater than the threshold eye gaze time interval in length are captured.

* * * * *